United States Patent [19]

Lammi

[11] Patent Number: 5,783,293
[45] Date of Patent: Jul. 21, 1998

[54] GOLF BALL WITH A MULTI-LAYERED COVER

[75] Inventor: Robert N. Lammi, Norton, Mass.

[73] Assignee: Acushnet Company, Fairhaven, Mass.

[21] Appl. No.: 745,137

[22] Filed: Nov. 7, 1996

[51] Int. Cl.$^6$ ........................................ B32B 9/00
[52] U.S. Cl. .......................... 428/212; 428/11; 428/213; 428/220; 428/259; 428/260; 428/287; 428/288; 428/402; 428/403; 428/407; 473/351; 473/365; 473/373; 473/377; 264/248; 264/250; 242/435; 242/436
[58] Field of Search ........................ 428/407, 11, 402, 428/403, 372, 323, 212, 213, 217, 220, 260, 259, 286, 287, 288; 473/365, 351, 377, 378, 373; 242/435, 436; 264/248, 250

[56] References Cited

U.S. PATENT DOCUMENTS

| | | | |
|---|---|---|---|
| 3,454,280 | 7/1969 | Harrison et al. | 273/235 |
| 3,819,768 | 6/1974 | Molitor | 260/897 |
| 4,431,193 | 2/1984 | Nesbitt | 273/235 R |
| 4,625,964 | 12/1986 | Yamada | 273/62 |
| 4,670,199 | 6/1987 | Montet et al. | 264/1.9 |
| 4,919,434 | 4/1990 | Saito | 273/235 R |
| 4,944,909 | 7/1990 | Eckardt et al. | 264/255 |
| 5,150,906 | 9/1992 | Molitor et al. | 273/220 |
| 5,253,871 | 10/1993 | Viollaz | 273/228 |
| 5,314,187 | 5/1994 | Proudfit | 273/235 R |
| 5,467,994 | 11/1995 | Moriyama et al. | 273/222 |
| 5,645,786 | 7/1997 | Okada et al. | 264/255 |

FOREIGN PATENT DOCUMENTS 40 41 799  7/1992  Germany.

*Primary Examiner*—Patrick Ryan
*Assistant Examiner*—Abraham Bahta
*Attorney, Agent, or Firm*—Pennie & Edmonds LLP

[57] ABSTRACT

The present invention is directed towards a multi-layer golf ball cover formed by a sandwich injection molding process, wherein said golf ball cover comprises an inner layer and an outer layer of a first material and an intermediate layer therebetween of a second material. The present invention is directed towards a sandwich injection molding process for forming a multi-layer golf ball cover involving the steps of pushing a measured amount of a plasticized first material into one end of an accumulation cylinder, pushing a measured amount of a plasticized second material into the opposite end of the accumulation cylinder, and injecting both materials in a single plunging step, so that the first material substantially coats the surface of the mold while the second material substantially fills the interior of the first material.

21 Claims, 5 Drawing Sheets

GOLF BALL WITH A MULTI-LAYERED COVER

FIELD OF INVENTION

This invention relates generally to golf balls, and more specifically, to a method of making a golf ball with a multi-layer cover. In particular, this invention relates to a method of making a golf ball having a cover with three layers comprised of at least two different materials.

BACKGROUND

It is well known that golf balls are typically constructed with a cover that tightly surrounds a core. It is typical for a golf ball core to have a solid construction or a wound construction and the methods of forming these cores are well known in the art. Traditionally, golf ball covers are formed from polymeric materials. For instance, golf balls have traditionally incorporated covers made of balata rubber, which may be a natural balata, a synthetic balata, or a blend of natural and synthetic balata.

Other golf balls have incorporated covers which are formed from synthetic polymeric materials such as polyolefins and in particular, polyethylene, polyurethanes, and ionic copolymers of olefins. The latter mentioned ionic copolymers of olefins were commercially introduced in the mid 1960's by E. I. Du Pont de Nemours & Co., Inc., Wilmington, Del. (DuPont) and sold under the trademark "SURLYN." Golf balls incorporating SURLYN covers are generally described in U.S. Pat. No. 3,454,280. Cover compositions that are based on SURLYN resins are advantageous in that the resulting covers are cut and abrasion resistant compared to the balata covers. While golf balls incorporating SURLYN resin covers are commonly known by players to be more cut resistant than balata covered balls, they traditionally tend to reduce the spin imparted to a golf ball and produce a less desirable "feel" as compared to a balata covered ball.

SURLYN resins sold by DuPont typically contain zinc, lithium or sodium ions. A number of SURLYN resins of varying physical properties are sold by DuPont. The physical properties of these resins are described in technical bulletins which are readily available from DuPont. Mixtures of various SURLYN resins as cover stock materials are likewise highly advantageous. Suitable mixtures for use as cover materials are described in U.S. Pat. No. 3,819,768.

For purposes of control, golfers strike a golf ball in such a manner that the ball has substantial back spin. It is desirable that a golfer be able to impart back spin to a golf ball for purposes of controlling its flight and controlling the action of the ball upon landing on the ground. For example, substantial back spin will make the ball stop once it strikes the landing surface instead of bounding forward. The ability to impart back spin onto a golf ball is related to the deformation of the golf ball cover when struck with a golf club. Generally, the more deformable the cover is, the easier it is to impart spin to the balls. This is particularly true for short or wedge shots.

Thus, it is desirable to combine the properties of SURLYN covered golf balls with the properties of Balata covered golf balls. For example, it is desirable to have less spin on a drive such that the ball has a "low spin trajectory", i.e., the ball does not climb like a typical high spin rate ball would, and the ball has substantial roll after it lands on the ground to provide maximum distance. On the other hand, for approach shots, i.e., short shots into the green, spin is critical to control the ball when it lands. With a high spin rate, the ball will stop or "sit" when it hits the green. Thus, with a high spin rate, the ball can be hit directly at the target. With a low spin rate, the ball often bounces off the green or "runs" off the green. Thus, it is desirable to have a high spin rate for approach shots into the green.

Further, it is desirable to combine the durability of SURLYN covered balls with the click and feel of balata covered balls. One method of doing this is to provide a cover with multiple cover layers.

Typically, the golf ball cover layer is formed by one of two processes. The first process includes the compression molding of hemispheres. First, two hemispherical covers, called half-shells, are injection molded. The hemispheres are then placed around a core and compression molded so that they fuse around the core and so that dimples are imparted into the cover. The cover is then finished to remove any visible molding lines or residue. The second process, called the retractable pin injection molding process, involves injection molding of the cover directly around a core positioned on pins, removing the pins once the cover material surrounds the core, removing the covered core, and finishing it to form a completed golf ball. In both cover forming processes, the injection molding of the covers involves techniques known in the art. These techniques generally involve forcing melted material to substantially fill and take on the shape of a mold, thereby forming a cover or hemisphere. When the material is cool enough to substantially maintain the shape of the mold, it is ejected from the mold.

Typically, the cover material begins the injection molding process as resin pellets which are stored in a hopper. The pellets are gravity fed into a heated cylinder which melts the pellets as a screw pushes the softening pellets toward an accumulation zone. When enough melted material is accumulated to fill the mold, the screw is pushed or stroked forward, thereby forcing the melted material into the mold. Many prior art references are directed to mixing different materials to form new cover materials. This is traditionally accomplished by mixing pellets of different materials in the injection mold hopper.

There are also several patents which are directed to golf balls having multiple cover layers. For example, U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin.

U.S. Pat. No. 5,314,187 also relates to golf balls having multiple layer covers, wherein the outer layer is molded over the inner layer and comprises a blend of balata and an elastomer where the inner layer is an ionomer resin.

U.S. Pat. No. 4,919,434 is directed towards a golf ball having a cover which comprises an inner layer and an outer layer each of which is a thermoplastic resin. Preferably the layers comprise thermoplastic resin materials that are capable of fusion bonding with each other.

These references are primarily directed to the use of an inner layer and an outer layer to alter the ball characteristics. They also disclose the method of forming an inner layer and then forming an outer layer thereover.

Methods of manufacturing multilayer articles such as automobile headlights in a substantially different manner are discussed in U.S. Pat. Nos. 4,944,909 and 4,670,199 as well as in German Patent No. 4041799. Each of these references disclose injecting two materials through a single injection sprue or channel. The basic method is comprised of the steps of injecting a first material through a sprue into the mold and then injecting a second material into the mold through the same sprue. Due to the flow characteristics of the molten material, the first material adheres to the mold to form an outer skin and the inner material tends to flow through the center of the skin layer such that the second material is sandwiched between the first material.

SUMMARY OF THE INVENTION

The present invention relates to a sandwich injection molding process for forming a multi-layer golf ball cover involving the steps of feeding a measured amount of a first material into one end of an accumulation cylinder, feeding a measured amount of a second material into the accumulation cylinder adjacent the first material, and injecting both materials into a golf ball cover mold in a single plunging step, so that the first material substantially coats the surface of the golf ball cover mold while the second material substantially fills an interior portion between coating layers of the first material.

The present invention is also directed towards a golf ball having a multi-layer cover formed by a sandwich injection molding process, whereby a first material is divided into an inner layer and an outer layer by an injected intermediate layer of a second material. More particularly, the invention is directed to an improved ball having significantly improved spin rates that is comprised of an inner layer and outer layer made from a soft material, preferably a material having a Shore D hardness less than 60, and an intermediate layer made of a harder material, preferably a material having a Shore D hardness greater than 65. Most preferably, the inner and outer layers are made of a material having a Shore D hardness of less than about 35 and the intermediate layer is made of a material having a Shore D hardness of about 68 or greater. Still further, the inner and outer layers are preferably thinner than the intermediate layer. The intermediate layer is preferably about 2/5 to 4/5 of the cover thickness and the outer layer is less than about 1/5 of the cover thickness.

The first and second cover materials each may be a dynamically vulcanized thermoplastic elastomer, a functionalized styrene-butadiene elastomer, a polyetherester, a polyesterester, a metallocene polymer, a thermoplastic polyetheramide, a thermoplastic ionomer, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylenevinyl alcohol polymer, a tetrafluoroethylene polymer, a reinforced polymer, or blends thereof. In a preferred embodiment, the first cover material and the second cover material have similar melting points.

DETAILED DESCRIPTION OF THE INVENTION

Figure 1:
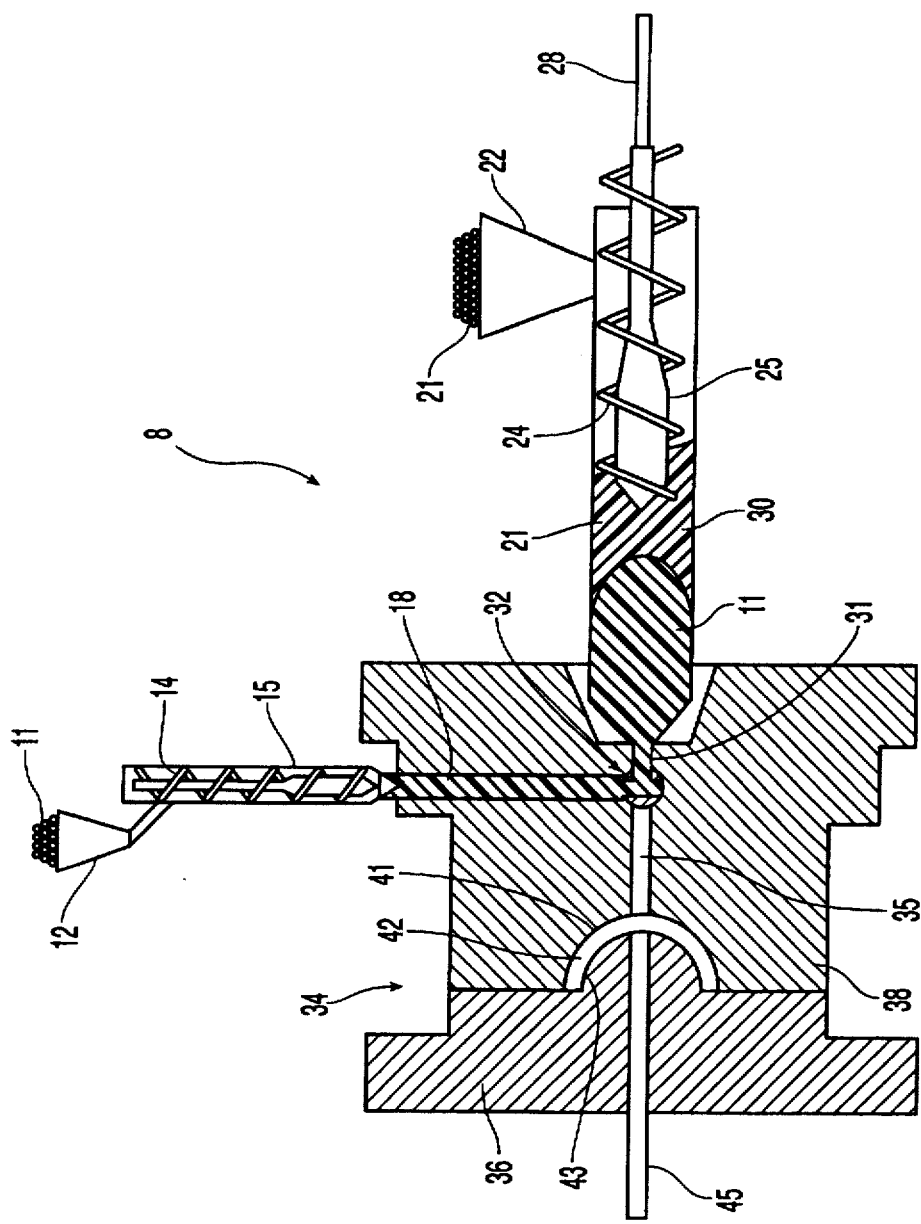
FIG. 1 is an elevational sectional view of a multi-material injection molding machine for making ball cover hemispheres.
Figure 6:
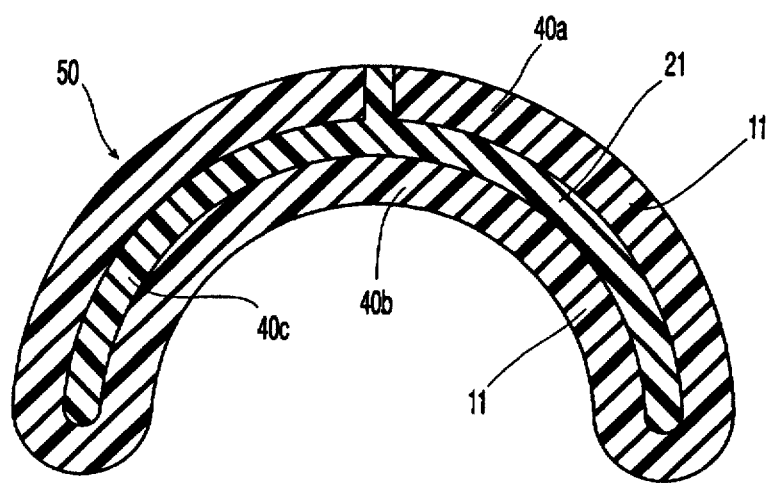
FIG. 6 is a ball cover hemisphere.

Referring to FIG. 1, a sandwich injection-molding machine 8 for producing a two-material, golf ball cover hemisphere 50 (FIG. 6) is shown. The injection molding machine 8 includes two hoppers 12 and 22, an accumulation chamber 30, a mold 34, a three-way valve 32, and a plurality of channels 18, 31 and 35 interconnecting the same. More particularly, a first hopper 12 contains a first material 11 and a second hopper 22 contains a second material 21. The three-way valve 32 controls the flow direction of the materials 11 and 21. The first channel 18 connects the first hopper 12 with the three-way valve 32. The second channel 31 connects the accumulation chamber 30 to the three-way valve 32. The third channel 35 connects the three-way valve 32 with the mold cavity 42.

In a preferred process, pellets of a first material 11 are loaded into hopper 12, where they feed by gravity or other means known in the art to screw 14. Heat is applied to plasticize the first material 11 and screw 14 turns within cylinder 15 to pump a measured amount of plasticized first material 11 through channel 18 to the three-way valve 32. The material is heated above its melt temperature and preferably to a temperature greater than about 400° F. The three-way valve 32 is positioned such that the flow of the molten first material 11 is fed into the accumulation chamber 30. The accumulation chamber is heated such that the material remains in the molten state.

Figure 4:
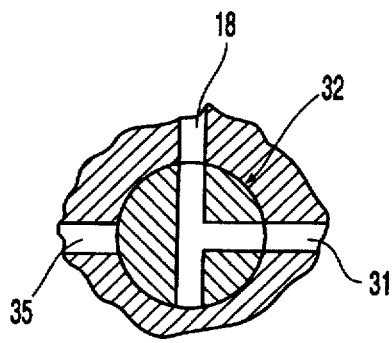
FIG. 4 is an enlarged section of FIG. 1 showing the mold three-way valve.
Figure 5:
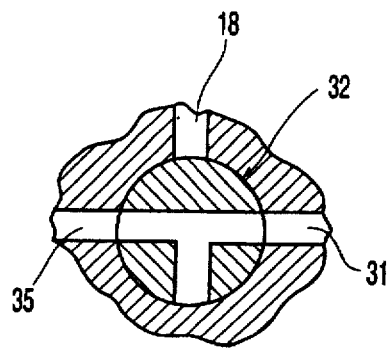
FIG. 5 is an enlarged section of FIG. 1 showing the mold three-way valve.

Valve 32 is a positionable valve for selectively permitting material flow from channel 18 into accumulation chamber 30 (see FIG. 4); and material flow from accumulation chamber 30 to mold cavity 42 without diversion back into channel 18 (see FIG. 5).

Pellets of a second material 21 are loaded into hopper 22, where they feed by gravity or other means known in the art to screw 24. Heat is applied to plasticize the second material 21. The material is heated above its melt temperature and preferably to a temperature greater than about 400° F. Screw 24 forces a measured amount of plasticized second material 21 into accumulation chamber 30, where the second material 21 and the first material 11 abut.

The first step of the process includes inserting a predetermined amount of the second material 21 into the heated accumulation chamber 30 with the three-way valve 32 closed. Then a predetermined amount of the first material 11 is inserted into the accumulation chamber 30 through the three-way valve 32 as shown in FIG. 4. Thereafter, the position of three-way valve 32 is changed, such that the flow path to channel 18 is closed, and the flow path through passageway 35 to the mold cavity 42 is open. A plunger 28 is used to force both the first material 11 and the second material 21 past three-way valve 32, through channel 35 and into the mold cavity 42. The mold cavity 42 is substantially in the shape of a hemispherical half-shell, and is formed by a mold half 36 and a mold half 38.

Figure 2:
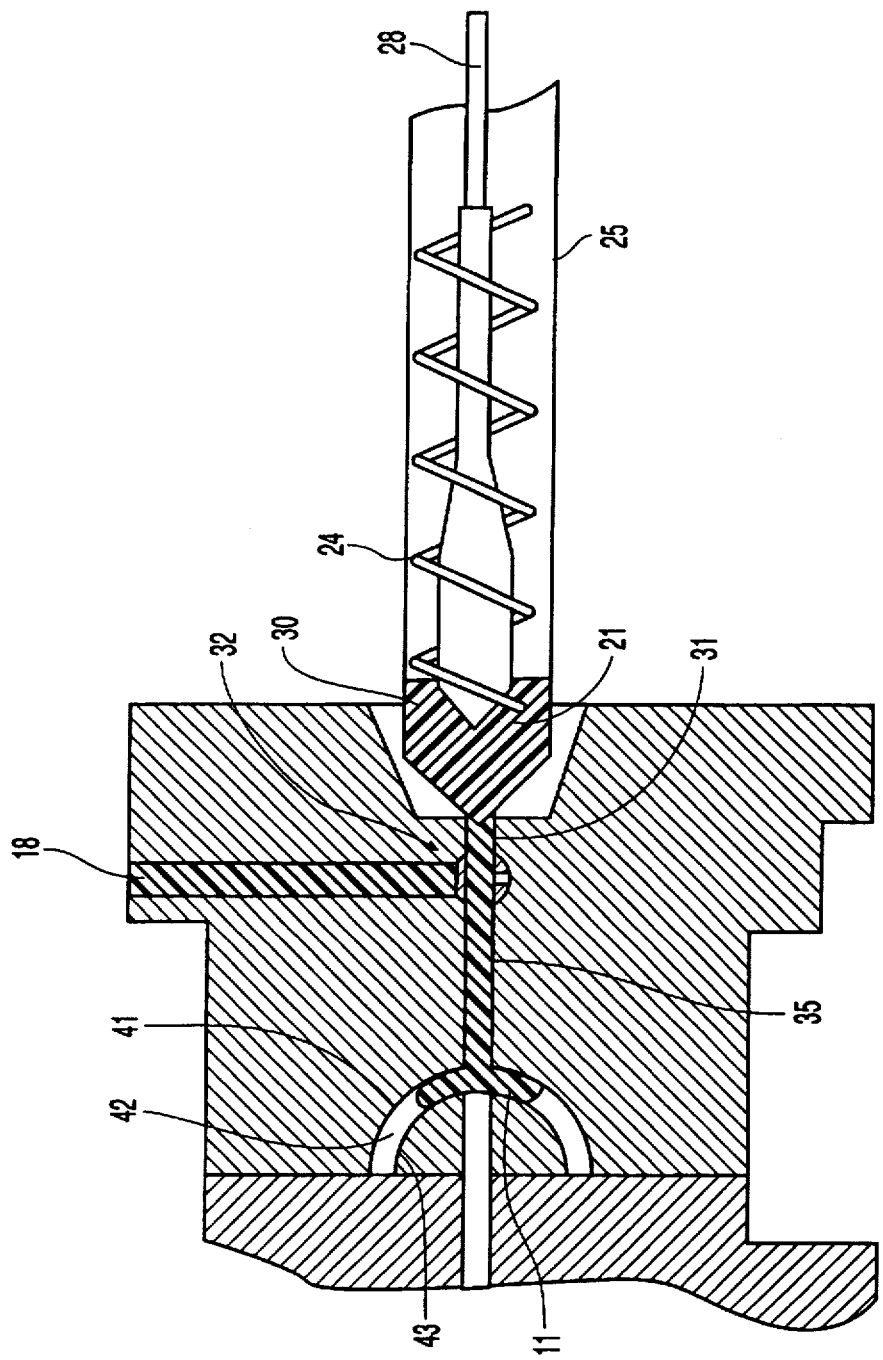
FIG. 2 is an enlarged section of FIG. 1 showing the plunger injecting material to form a cover hemisphere.

Turning to FIG. 2, plunger 28 is translated to the left, pushing materials 11 and 21 through valve 32 along channel 35 into mold cavity 42. At this point, only the first material 11 has entered the mold cavity 42. The flow is circumferential about the channel 35. The mold halves 36 and 38 are cooled so that the molten material solidifies in the mold cavity 42. Preferably, the mold halves 36 and 38 are maintained at a temperature below about 100° F. Most preferably, the mold halves are maintained at a temperature below 50° F. so that the molten material freezes to the mold walls 41 and 43. First material 11, thus, flows into the mold cavity 42 and substantially adheres to the cavity surfaces 41 and 43 of mold cavity 42. Since there is a sharp temperature gradient in the first material 11, hot in the center and cold on the edges against the mold halves 36 and 38, the flow of material is much easier through the center. The material must be pushed into the mold cavity 42 with sufficient pressure to allow the material to fill the cavity 42 before it solidifies. Preferably, the injection pressure is greater than about 2000 psi.

Figure 3:
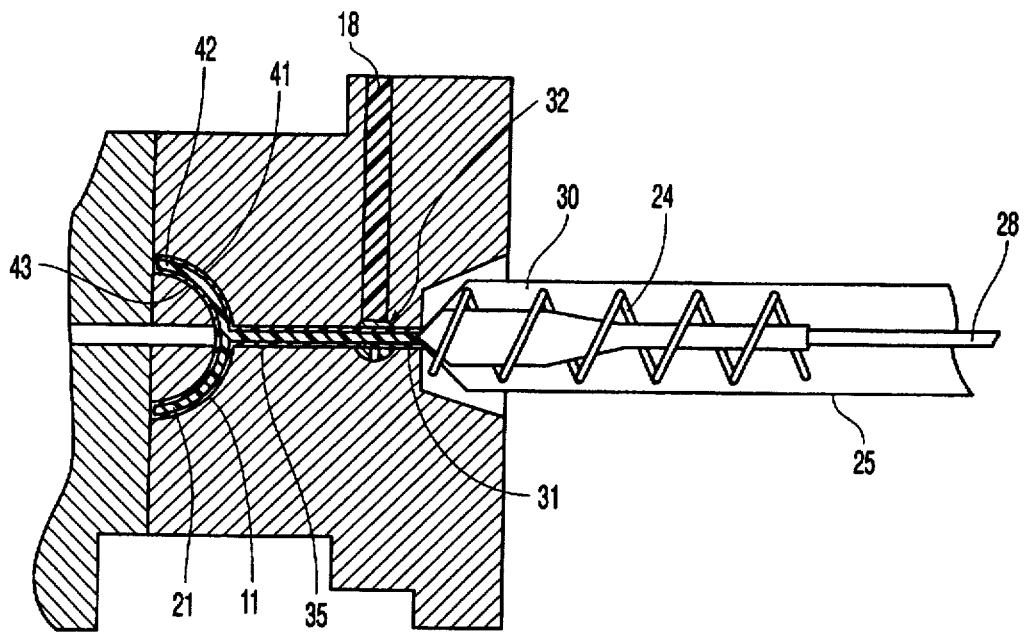
FIG. 3 is an enlarged section of FIG. 1 showing the plunger completing the injection of material to form a cover hemisphere.

Referring now to FIG. 3, second material 21 with the first material 11 substantially fills the mold cavity 42. The second material 21 follows the first material 11. Since the mold 34 is maintained at a temperature much lower than the melting temperature of the first material 11, generally a temperature of less than 100° F. and preferably about 40° F., the first material 11 solidifies against the surfaces 41 and 43 of the mold cavity 42 as it flows into the mold cavity 42. Flow into the mold cavity 42 is, thus, through the middle or center of the first material 11. Since the second material 21 follows the first material 11, it flows through the center of the inner and outer layers 40a and 40b, forming an intermediate layer 40c (see FIG. 6). In order to increase the thickness of the inner and outer layers 40a and 40b, more first material 11 can be used and the flow rate into the mold decreased. To make thinner inner and outer layers 40a and 40b, less first material 11 is used and the flow rate into the mold increased.

Once the materials 11 and 21 cool enough to substantially retain the shape of the mold cavity, the mold halves 36 and 38 are separated, and an ejector 45 (see FIG. 1) ejects a two material, three-layer hemisphere 50 (see in FIG. 6) from the injection molding machine 8.

Figure 7:
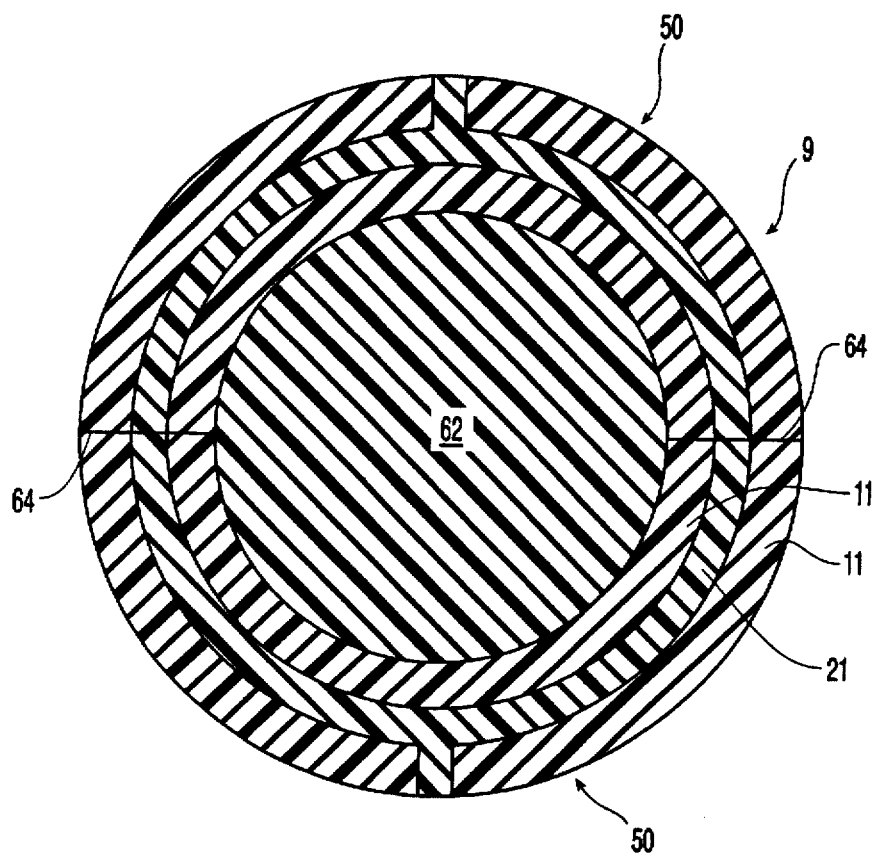
FIG. 7 is a golf ball according to the present invention.

Referring to FIG. 7, a completed golf ball 9 according to the present invention is shown. Core 62 is surrounded by two three-layer hemispheres 50 which have been compression molded together, thereby forming compression molding seam 64. Compression molding hemispheres onto a core generally involves applying pressure and heat to mold the cover hemispheres onto the core and is known in the art. It is contemplated that the core 62 is a solid, polybutadiene type core, a solid core having multiple layers or a wound core.

It is contemplated that first material 11 and second material 21 each comprise one or more polymers. Useful polymers include a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, an acrylonitrile butadiene polymer, an acrylic styrene-acrylonitrile polymer, a terphthalate polymer, an ethylenevinyl alcohol polymer, a tetrafluoroethylene polymer, a reinforced polymer, or blends thereof. As noted above, the first and second layers should be different polymers or be polymers that have different properties.

Most preferably the first material 11 and second material 21 are comprised of thermoplastic ionomers or of a balata rubber and a thermoplastic ionomer, respectively. Suitable thermoplastic ionomer resins include any number of olefinic based ionomers including SURLYN® and IOTEK®, which are commercially available from DuPont and Exxon, respectively.

Among the preferred materials for first material 11 and/or second material 21 are ionomer resins obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component of the subject invention includes E/X/Y copolymers where E is ethylene, X is a softening comonomer such as an acrylate, e.g., methyl acrylate, iso-butyl acrylate or n-butyl acrylate, present in 1–60 (preferably 10–40, most preferably 15–25), weight percent of the polymer, and Y is ethylenically unsaturated organic acid, such as acrylic or methacrylic acid, present in 5–35 (preferably 10–35, most preferably 16–21) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations. Lithium, sodium, magnesium and/or zinc are preferred.

Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described, e.g., in U.S. Pat. No. 3,262,272. Such ionomer resins are commercially available from DuPont Co. under the tradename SURLYN®.

Additionally, foamed polymeric materials are suitable for use in the cover layers of the present invention. In particular, metallocene-based foam resins are useful in the cover layers of the present invention.

Still further, the first or second materials 11 or 21 can be comprised of balata rubber or of a synthetic balata.

In the preferred embodiment of the present invention, first material 11 has a melting point or heat of reaction (cure) temperature which is similar to that of second material 21. Alternatively, first material 11 has a melting point or heat of reaction temperature which is higher than that of second material 21, but at a temperature which does not cause degradation of second material 21. In another alternative embodiment, second material 21 has a melting point or heat of reaction temperature which is higher than that of first material 11, but at a temperature which does not cause degradation of first material 11.

Various examples of golf balls according to the present invention are set forth below.

EXAMPLE 1

A polybutadiene core 62 having a diameter of 1.580 inches is covered with a three-layer cover comprised of the following:

| Material | FIRST MATERIAL 11 SURLYN 7930 | SECOND MATERIAL 21 SURLYN 8320 |
|---|---|---|
| Composition | 30% | 70% |
| Tensile Strength, psi | 3,800 | 3,100 |
| Tensile Strain @ Break, % | 290 | 770 |
| Flexural Modulus, psi | 67,000 | 2,800 |
| Melt Flow, g/10 min | 1.8 | 0.9 |
| Hardness, Shore D | 68 | 25 |
| Bashore Resilience | 53 | 42 |

* Material properties from supplier's data.

This example was formed by first forming cover hemispheres in a mold. The first and second materials were heated to approximately 400°–425° F. The injection of the first and second materials into the 40° F. mold was carried out in three stages. In the first stage, the injection into the mold was at a rate of about 3.15 in/s and a pressure of about 2,465 psi for 1 second. In the second stage, the injection rate was decreased to 0.8 in/s for about 4 seconds. In the third stage, the pressure was increased to about 2,610 psi and the injection rate was increased to about 0.99 in/s for 5 seconds. The first material adhered to the surfaces of the mold to form the inner and outer layers of the cover hemisphere and the second material flowed between the inner and outer layers to form an intermediate layer. Two hemispheres were then compression molded about the polybutadiene core to form the golf balls.

EXAMPLE 2

A polybutadiene core having a diameter of 1.580 inches is covered with a three-layer cover comprised of the following:

| Material | FIRST MATERIAL 11 SURLYN 8320 | SECOND MATERIAL 21 SURLYN 7930 |
|---|---|---|
| Composition | 30% | 70% |
| Tensile Strength, psi | 3,100 | 3,800 |
| Tensile Strain @ Break, % | 770 | 290 |
| Flexural Modulus; psi | 2,800 | 67,000 |
| Melt Flow, g/10 min | 0.9 | 1.8 |
| Hardness, Shore D | 25 | 68 |
| Bashore Resilience | 42 | 53 |

*Material properties from supplier's data.

This example was formed by first forming cover hemispheres in a mold. The first and second materials were heated to approximately 400°–425° F. The injection of the first and second materials into the 40° F. mold was carried out in two stages. In the first stage, the injection into the mold was at a rate of about 7.9 in/s and a pressure of about 2,465 psi for 3 seconds. In the second stage, the injection rate was decreased to 1.97 in/s and the pressure increased to about 2,610 psi for 7 seconds. The first material adhered to the surfaces of the mold to form the inner and outer layers of the cover hemisphere and the second material flowed between the inner and outer layers to form an intermediate layer. Two hemispheres were then compression molded about the polybutadiene core to form the golf balls.

The following tables set forth the test data for the golf balls made in Examples 1 and 2 above.

TABLE I

Spin Rate Test Results for a Driver

| Sample | Spin Rate |
|---|---|
| Pinnacle Gold | 3000 |
| Tour Balata | 3900 |
| Example 1 | 3300 |
| Example 2 | 3175 |

TABLE II

Spin Rate Test Results for an 8 Iron

| Sample | Spin Rate |
|---|---|
| Pinnacle Gold | 7800 |
| Tour Balata | 9150 |
| Example 1 | 4250 |
| Example 2 | 8125 |

TABLE III

Spin Rate Test Results for a Full Wedge

| Sample | Spin Rate |
|---|---|
| Pinnacle Gold | 7150 |
| Tour Balata | 10700 |
| Example 1 | 8950 |
| Example 2 | 9550 |

TABLE IV

Spin Rate Test Results for a 50 Yard Wedge

| Sample | Spin Rate |
|---|---|
| Pinnacle Gold | 3800 |
| Tour Balata | 7100 |
| Example 1 | 5150 |
| Example 2 | 6150 |

The Pinnacle Gold ball is comprised of a 1.51 inch diameter polybutadiene core covered with a standard Li/Na blend SURLYN and has a "low spin rate" and is considered a distance ball. The Titleist Tour Balata ball is comprised of a wound core covered by a balata rubber cover and has a "high spin rate" and is considered a control ball.

From the test results above, it is apparent that very good spin rates were obtained with the Example 1 golf balls. The driver spin rate of 3300 was closer to the Pinnacle Gold than the Tour Balata and the 8 iron spin rate of 8950 was between the Pinnacle Gold and the Tour Balata.

Regarding the test results for Example 2, it is clear that this ball exhibited exceptional results that are very surprising. The driver spin rate was less than Example 1 and very close to the spin rate for the Pinnacle Gold. However, the spin rates for the wedge and 50 yard wedge were significantly greater than for Example 1 and were very near the Tour Balata ball. Thus, it is evident that a ball according to the present construction and having a skin material with a low flexural modulus, less than 10,000 psi, and a low hardness, less than 50 Shore D provides exceptional results. Since the ball cover was only about 0.05 inches thick and the first material was only about ⅓ of the cover material, the outer skin layer was thinner than the intermediate layer. More particularly, the intermediate layer comprises about 2/5 to 4/5 of the cover thickness and the inner and outer layers of the cover are preferably less than about 1/5 of the cover thickness each. For a ball having a cover thickness of about 0.05 inches, the outer layer should be about 0.01 inches or less. From the surprising test result shown here, it appears that the thicker intermediate layer plays more of a significant part in the driver spin rate, but that the thinner outer skin layer affects the wedge spin rate more. Thus, there is a significant advantage in being able to achieve more driving distance from the intermediate layer and more spin and control of wedge shots from the thin outer layer by making a ball having the multiple layers, wherein the outer layer is substantially thinner than the intermediate layer. More particularly, by forming a golf ball with three layer cover, wherein the outer layer is less than about 1/5 the cover thickness and the intermediate layer is about 2/5 to 4/5 of the cover thickness, the ball's spin rate at slow swing speeds, i.e. shots hit with a wedge, can have a high spin rates and the ball's spin rate at high swing speeds, i.e. shots with a driver, can have low spin rates.

Figure 8:
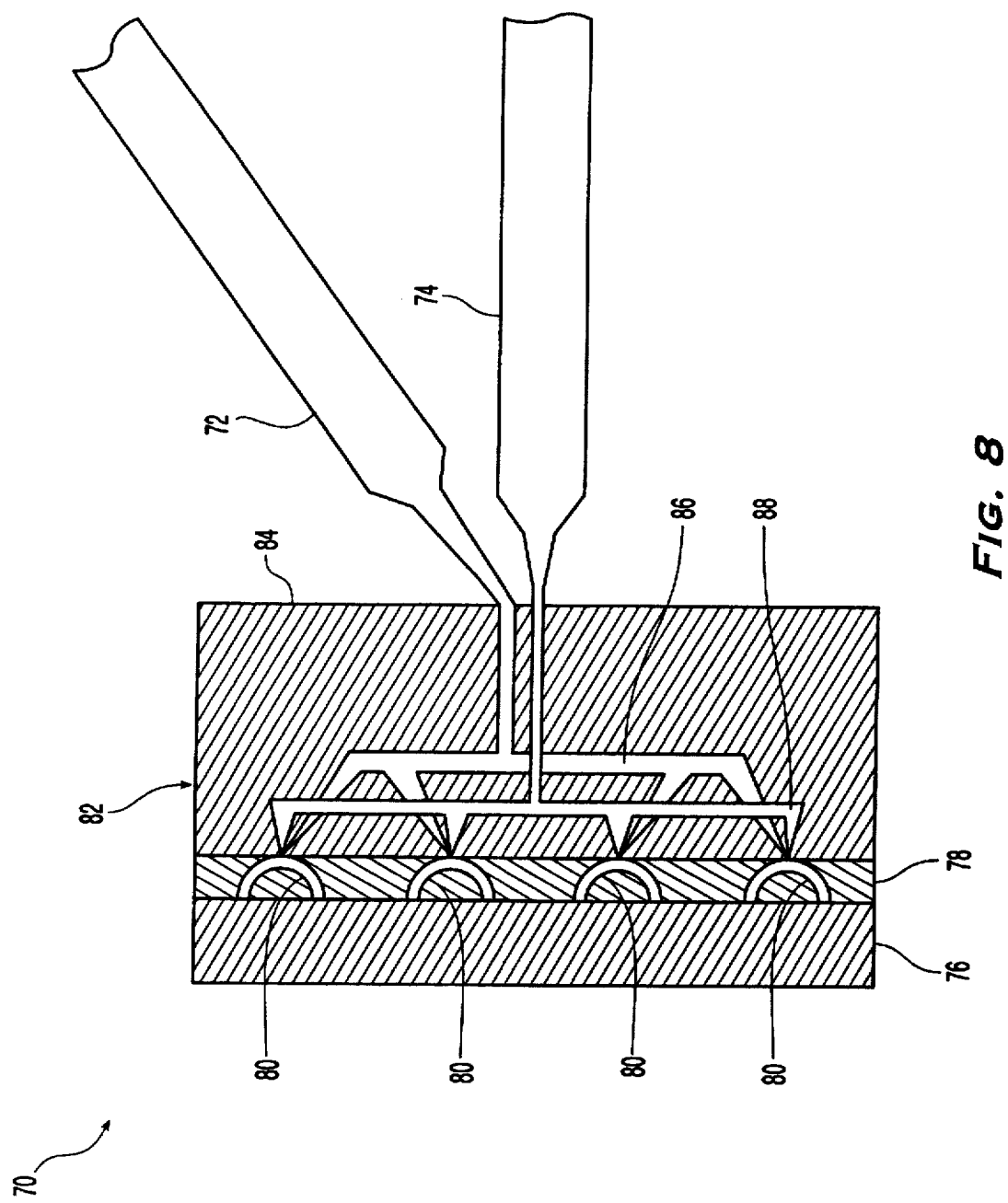
FIG. 8 is an elevational sectional view of a multi-material injection molding machine for making ball cover hemispheres having a hot runner system.

Referring to FIG. 8, golf ball cover hemispheres can also be molded in sandwich injection-molding machine 70 that includes two accumulation chambers 72 and 74 for materials 11 and 21. This sandwich injection-molding machine also includes two mold halves 76 and 78 to form a plurality of mold cavities 80. However, this machine further includes a hot runner system 82 comprised of a hot manifold 84 and hot runners 86 and 88 interconnecting the accumulation chambers 72 and 74 with the mold cavities 80. The hot runners 86 and 88 are maintained at a temperature above the melting point of the materials 11 and 21 so that the material does not solidify therein. A predetermined amount of the first material 11 is fed into the accumulation chamber 72 and injected through the hot runner system 86 into the mold cavities 80. Then a predetermined amount of the second, different material 21 is injected from accumulation chamber 74 through hot runner system 88 and into the mold cavities 80. This eliminates the waist that is created in the cold runner 35 discussed above and creates a quicker molding method.

The golf balls in the examples were constructed using a compression molding method. However, it will be apparent to those skilled in the art that the golf balls can also be constructed by the retractable pin injection molding process, which involves injection molding of the cover directly around a core positioned on pins. The pins are removed once the cover material surrounds the core and has solidified to the extent the core will not move. In this process, the compression molding seam 64 can be eliminated. After the cover materials have hardened, the covered core is removed and finished to form a completed golf ball. Based on the teachings herein, the necessary modifications to the standard retractable pin injection molding processes will be readily apparent to those skilled in the art.

While it is apparent that the illustrative embodiments of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

I claim:

1. A golf ball comprising a core and a cover surrounding the core, the cover comprising an inner layer and an outer layer of a first material comprising one or more polymers, and an intermediate layer between the inner and outer layers of a second material comprising one or more polymers wherein the second material is harder than the first material.

2. The golf ball of claim 1 wherein the outer layer has a thickness which is less than that of the intermediate layer.

3. The golf ball of claim 2 wherein the outer layer represents less than about 1/5 of the thickness of the cover, while the intermediate layer represents about 2/5 to 4/5 of the thickness of the cover.

4. The golf ball of claim 2 wherein the outer layer has a flexural modulus of about 10,000 psi or less and a hardness of about 50 Shore D or less.

5. The golf ball of claim 4 wherein the Shore D hardness of the intermediate layer is at least 60.

6. The golf ball of claim 4 wherein the flexural modulus of the intermediate layer is at least 5 times greater than that of the outer layer.

7. The golf ball of claim 1 wherein the inner layer and outer layer of the first material each have a flexural modulus of less than 10,000 psi and the second material has a flexural modulus of greater than 50,000 psi.

8. The golf ball of claim 1 wherein the inner layer and outer layer of the first material each have a Shore D hardness of less than 50 and the second material has a Shore D hardness of greater than 60.

9. The golf ball of claim 1, wherein said first material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

10. The golf ball of claim 9, wherein said second material is comprised of one or more polymers selected from the group consisting of a thermoplastic ionomer, a dynamically vulcanized thermoplastic elastomer, a functionalized styrene-butadiene elastomer, a polyetherester, a polyesterester, a metallocene polymer, a thermoplastic polyetheramide, a thermoplastic polyester, a thermoplastic polyurethane, a ethylene or propylene based polymer, a methyl acrylate, a methyl methacrylate polymer, a polycarbonate, a polyamide, a polyphenylene oxide, a polyether ketone, a polysulfone, a acrylonitrile butadiene polymer, a acrylic styrene-acrylonitrile polymer, a terphthalate polymer, a ethylene-vinyl alcohol polymer, a tetrafluoroethylene polymer, a reinforced polymer, and blends thereof.

11. The golf ball of claim 1, wherein the core is a solid core.

12. The golf ball of claim 1, wherein the core is a wound core.

13. A method of increasing the spin rate of a golf ball at low swing speeds by providing a core and forming a cover about the core, said cover having inner and outer layers of a first material comprising one or more polymers and an intermediate layer of a second material comprising one or more polymers wherein the second material is harder than the first material.

14. The method of claim 13 wherein the outer layer comprises less than about 1/5 of the cover thickness and the intermediate layer comprises about 2/5 to 4/5 of the cover thickness.

15. The method of claim 14 further comprising the step of forming the inner and outer layers of a material having a flexural modulus less than about 10.000 psi and forming the intermediate layer of a material having a flexural modulus greater than about 50.000 psi.

16. The method of claim 15 further comprising the step of forming the inner and outer layers of a material having a Shore D hardness less than about 50 and forming the intermediate layer of a material having a Shore D hardness greater than about 60.

17. The method of claim 13 further comprising the step of injecting a predetermined amount of the first material into a mold to form the inner and outer layers; and injecting a predetermined amount of second material into the mold substantially between the inner and outer layers.

18. A golf ball comprising a core and a cover surrounding the core, the cover comprising an inner layer and an outer layer of a first material comprising one or more polymers, and an intermediate layer between the inner and outer layers of a second material comprising one or more polymers wherein the second material has different physical properties than the first material.

19. The golf ball of claim 18 wherein the second material is softer than the first material.

20. The golf ball of claim 18 wherein the outer layer has a thickness which is less than that of the intermediate layer.

21. The golf ball of claim 20 wherein the outer layer represents less than about 1/5 of the thickness of the cover, while the intermediate layer represents about 2/5 to 4/5 of the thickness of the cover.

* * * * *